United States Patent
Gohlke

[19]
[11] Patent Number: 6,029,412
[45] Date of Patent: Feb. 29, 2000

[54] INTUMESCENT INTERLOCKING COLLAR

[75] Inventor: Henry J. Gohlke, Spring, Tex.

[73] Assignee: RectorSeal Corp., Houston, Tex.

[21] Appl. No.: 08/798,916

[22] Filed: Feb. 12, 1997

[51] Int. Cl.[7] ....................................................... F16L 5/02
[52] U.S. Cl. ................................ 52/232; 137/75; 285/64; 285/192
[58] Field of Search .................................. 285/19, 61, 20, 285/62, 46, 63, 192, 64, 193, 194, 215; 52/232; 137/75; 16/2.1, 2.5; 248/56, 73, 73.1

[56] References Cited

U.S. PATENT DOCUMENTS

| 2,284,530 | 5/1942 | Meyer | 285/192 X |
| 2,574,142 | 11/1951 | Buongirno | 285/192 X |
| 3,402,945 | 9/1968 | Rittenhouse | 285/192 |
| 4,850,385 | 7/1989 | Harbeke | 137/75 |
| 5,103,609 | 4/1992 | Thoreson et al. | 52/232 |

FOREIGN PATENT DOCUMENTS

| 52327 | 10/1936 | Denmark | 285/192 |
| 266387 | 10/1989 | Japan | 285/46 |

OTHER PUBLICATIONS

3M Brochure–"3M Fire Barrier Plastic Pipe Device".
ABESCO Brochure–"The ABESCO Firetop FB Programme Intumescent Pipe Collars".

*Primary Examiner*—Dave W. Arola
*Attorney, Agent, or Firm*—Locke Liddell & Sapp LLP

[57] ABSTRACT

An interlocking intumescent collar is disclosed. The collar may be fitted around a pipe at the point where the pipe penetrates a wall or floor. The collar comprises a strip of intumescent material disposed on a collar body. Anchor tabs extend outward from the collar body and are adapted to be fastened to the wall or floor. The collar includes an interlock integral with the anchor tabs. The interlock holds the tabs in overlapping relationship when the collar is placed around a pipe. The interlock integral with the anchor tabs decreases manufacturing costs and facilitates the field installation of the collar.

13 Claims, 4 Drawing Sheets

INTUMESCENT INTERLOCKING COLLAR

BACKGROUND OF THE INVENTION

1. Technical Field

This invention relates to pipe assemblies and, in particular, to an intumescent fire stopping pipe collar having interlocking tabs.

2. Description of the Related Art

Practical installations of pipe, such as PVC pipe, in residential and commercial construction require that the pipe pass through or penetrate floors and walls. At the junction between the floor or wall and the pipe, there must be a hole large enough for the pipe to pass through and to allow positioning of the pipe. In practice, the hole may fit the pipe tightly or may be somewhat larger than the outside diameter of the pipe. A problem arises when the surface being penetrated is also fire resistant. In order to maintain the fire integrity of the penetration system, the pipe and annular space surrounding the pipe must be protected at a level equal to the protection offered by the original floor or wall. Fire protection schemes must include provisions for the melting of plastic pipe and insulation as well as maintaining the structural integrity of the penetrated surface.

A variety of methods have been employed to achieve the proper level of fire protection. One of the most popular methods is the use of intumescent, or expanding, materials. Upon application of heat, these materials expand several times their original volume to fill spaces or voids left by melted plastic pipe. For smaller sizes of pipe, filling the annular space with intumescent caulk is adequate. However, this method is limited by variations in hole diameter. Some hole diameters are either too large or too small to be practically filled with caulk. Also, for larger pipe sizes, more intumescent material must be used in a caulk system than is typically practical.

One method to control both the amount intumescent material used and the mechanical integrity of the pipe/fire-stop material is to surround the pipe with a metal shroud or fire-stop collar and to place the intumescent fill material between the collar and the plastic pipe. The collar is anchored to the penetrated surface. In part, the total system integrity is determined by the soundness of the connection between the collar and the penetrated surface. In many cases, multiple anchor points between the collar and the surface must be used.

Both light weight and heavy metal collars have been produced. Collars made from heavy gauge metal must be preformed at the factory to aid in the installation process. On the other hand, collars made from light gauge metal may be partially or entirely formed in the field. The tradeoff between field- or factory-formed collars becomes one of economics; however, factory-formed parts are generally more economical than field-formed parts for all but the most custom conditions. Since the metal collar must be placed around the pipe, the heavy gauge collar is generally made in two or more parts. The parts are held together with hinges, locking bars, hose clamps, clasps, fasteners, or a variety of tongue and groove arrangements.

One important feature of the fire stop collar is a tab that accepts a fastener to facilitate the attachment of the collar to the penetrated surface. The anchor tab can be integral, detachable, field, or factory formed. Anchor tabs may be symmetrically or asymmetrically disposed around the pipe. The number of anchor tabs is generally dictated by the structural integrity requirements of the fire protection system. While more tabs will increase the structural soundness, fewer tabs will reduce installation labor. Also, to reduce the number of tabs, stiffening flanges extending perpendicular to the surface of the tab may be added.

On the application of heat, for example in a fire, the intumescent material swells to fill the annular space and voids left by melted plastic pipe. To maximize the radially inward force of the intumescent material to close off any voids or spaces, a flange may be formed on the outstanding edge of the body of the collar. This flange prevents intumescent material from extruding longitudinally along the axis of the pipe. Also, the flange may be notched to facilitate forming the collar into a cylinder surrounding the pipe. The flange also adds stiffness to the outstanding edge of the collar body.

Existing fire stop collars utilize hinge-and-clasp mechanisms, lock bars, or hose clamps to hold the collar in a position surrounding the pipe. Those features must be manufactured separately from the collar, adding to the manufacturing cost. In addition, those types of clamping mechanisms are relatively difficult to use in the field. The hole in the floor or wall through which the pipe must pass is in many cases nearly the same size as the circumference of the pipe, leaving little room for the installer to manipulate the clamping mechanism. In addition, the installer must use one hand to hold the collar in place around the pipe, leaving only the other hand to operate the clamps, screws or lock bars.

SUMMARY OF THE INVENTION

The present invention is directed to overcoming or minimizing one or more of the problems discussed above.

The present invention includes an intumescent interlocking collar. The collar comprises a collar body and a strip of intumescent material disposed on the body. First and second anchor tabs may extend from one longitudinal edge of the body and are located at either end of the body. Additional anchor tabs may be provided. An interlock may be formed by the first and second anchor tabs so that the tabs interlock in an overlapping relationship when the collar is formed around the pipe. In one embodiment of the invention, one anchor tab is narrower than the other tab, and stiffening flanges are used to maintain the anchor tabs in an interlocking arrangement. In this embodiment, when the collar is formed around a pipe, the narrower anchor tab is held in place by the stiffening flanges of the wider anchor tab.

The present invention provides an intumescent fire stop collar that includes an interlock that is integral with the collar. As a result, manufacturing costs are less as compared to collars that require separate clamps or other mechanisms to hold the collar in place around a pipe. In addition, the present invention provides an interlock on a fire stop collar that is easily operated with one hand by the installer in the small working areas where pipes pass through walls and floors.

Other objects and advantages of the invention will become apparent upon reading the following detailed description and upon reference to the drawings.

Figure 1:
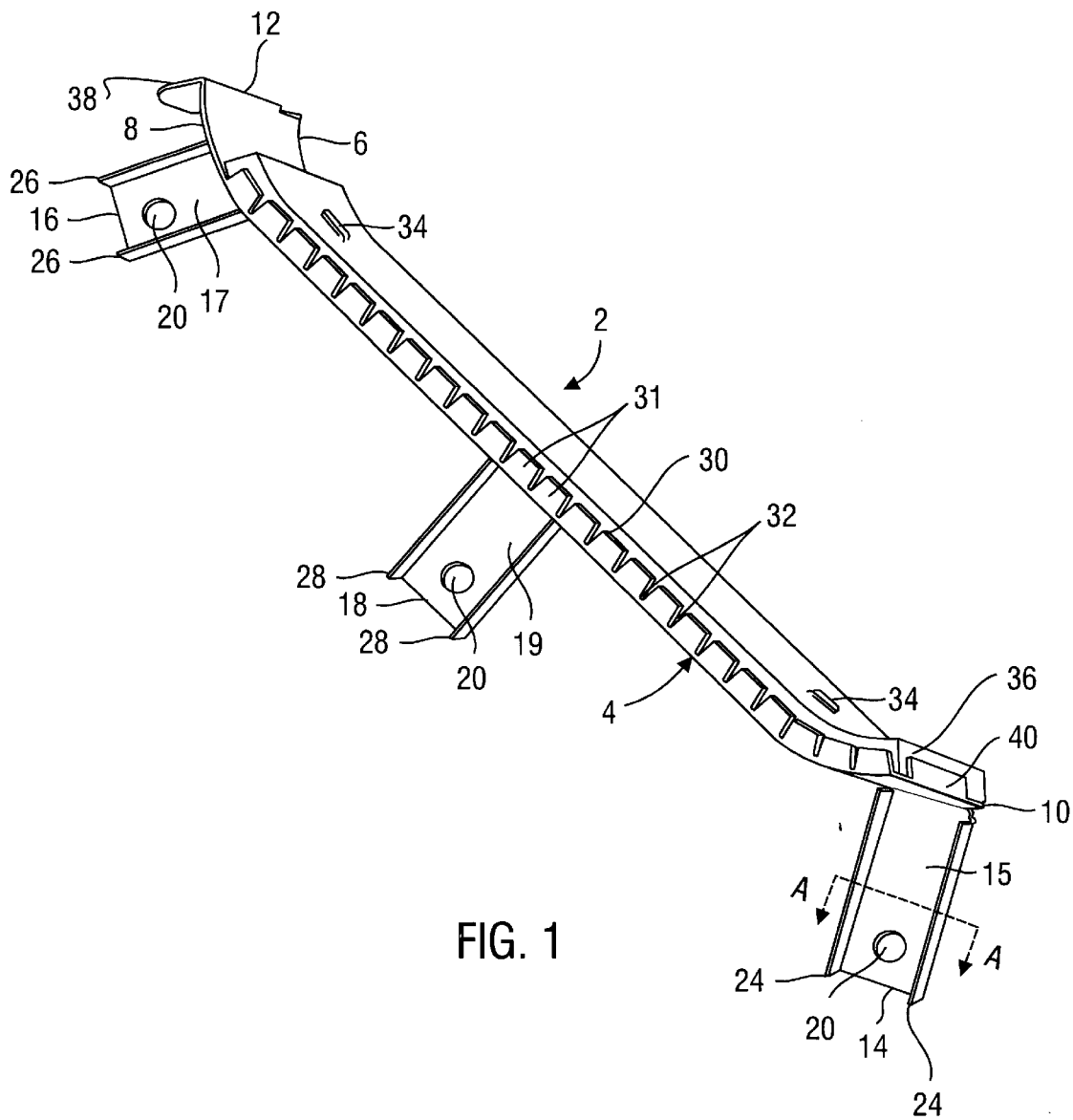
FIG. 1 illustrates a perspective view of the interlocking collar prior to forming the collar around a pipe.

While the invention is susceptible to various modifications and alternative forms, specific embodiments thereof have been shown by way of example in the drawings and will be described in detail in the Description below. It should be understood, however, that the specification is not intended to limit the invention to the particular forms disclosed. Instead, the invention is to cover all modifications, equivalents, and alternatives falling within the spirit and scope of the invention as defined by the appended claims.

DESCRIPTION OF A PREFERRED EMBODIMENTS

Figure 3:
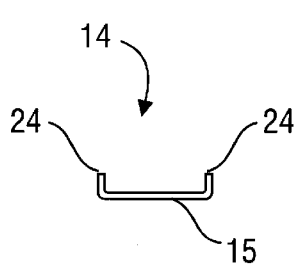
FIG. 3 illustrates the cross section of an anchor flange taken along line AA in FIG. 1.
Figure 2:
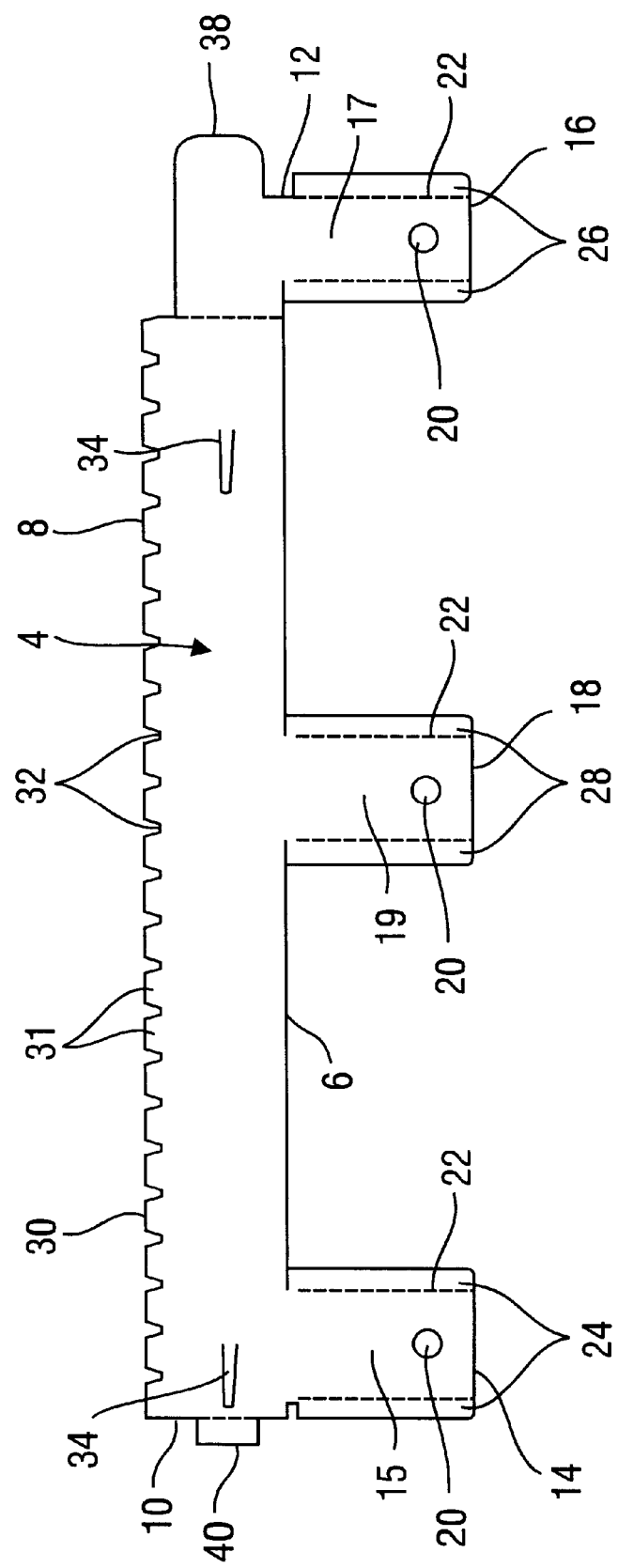
FIG. 2 illustrates the collar body as manufactured.

Referring to the drawings, and in particular, to FIGS. 1 through 3 inclusive, there is shown an intumescent interlocking collar 2 (FIG. 1). The collar includes a body 4 stamped from a flat sheet of 22 gauge or 24 gauge galvanized steel. The body 4 has first and second longitudinal edges 6, 8 and first and second ends 10, 12. Three anchor tabs 14, 16, 18 are formed on the first longitudinal edge 6 of the body 4. A first anchor tab 14 is located at or near the first end 10 of the body 4. The second anchor tab 16 extends outward from the same longitudinal edge and is located at or near the second end 12 of the body 4. A third anchor tab 18 extends outward from the first longitudinal edge 6 between the first anchor tab 14 and the second anchor tab 16. In one preferred embodiment of the present invention, the third anchor tab 18 is located midway between the first and second anchor tabs. Each of the tabs has a tab web, 15, 17, 19, respectively.

In one preferred embodiment of the present invention, the first and third anchor tabs 14 and 18, are the same width, while the second anchor tab 16 is narrower. Each anchor tab has an opening (for example, a hole or slot) 20 to allow fast insertion of a fastener.

The first, second, and third anchor tabs 14, 16, 18 may include stiffening flanges 24, 26, 28, respectively, which are preferably disposed substantially perpendicular to the longitudinal plane of the tab represented by the tab web. FIG. 2 shows dotted lines 22 showing the line along which the stiffening flanges will be formed. FIG. 3 illustrates the stiffening flanges 24 extending at right angles to the web 15 of the first anchor tab 14. The anchor tabs 14, 16, 18, preferably are preformed at right angles to the body 4 at the factory.

A restricting flange 30 extends from the second longitudinal edge 8 of the body 4. As shown in FIG. 3, after being formed, the restricting flange 30 extends substantially perpendicular to the body 4 in the opposite direction from the anchor tabs 14, 16, 18. The restricting flange 30 includes notches 32 to facilitate field forming of the collar 2 around a pipe. As a result, the restricting flange 30 is made up of fingers 31 separated by notches 32. The size and number of notches 32 are calculated to achieve a functionally and aesthetically tight fit around a pipe.

Lances 34 may be formed by punching through the body 4. As shown in FIG. 1, the lances 34 may be bent at right angles to the body 4 to extend from the body in the same direction as the restricting flange 30. The lances 34 hold a strip of intumescent material 36 (FIG. 1) in place on the body 4 by impaling the strip 36. Each lance 34 may be bent over after the intumescent material 36 is impaled on the lance 34.

As shown in FIG. 1, intumescent material 36 is disposed on the body 4. Lances 34 hold the intumescent material 36 in place, and the restricting flange 30 helps prevent longitudinal extrusion of the intumescent material 36 in the direction of the restricting flange 30. The preferred intumescent material 36 is commercially available from the RectorSeal Corporation of Houston, Tex. and is sold as RECTORSEAL WRAP STRIP™.

The body 4 may include a thumb tab 38 located at one end of the body 4. As shown in FIG. 3, the thumb tab 38 is formed from the body 4, extends at right angles to the face of the body 4 in the direction of anchor tabs 14, 16, 18.

A stop tab 40 may be used to facilitate positioning the intumescent material 36 during production. The stop tab 40 is located at one end of the body 4. The stop tab 40 is formed from the body, extends at right angles to the face of the body, in the direction of the restricting flange 30 as shown in FIG. 1.

The length of the interlocking collar 2, including the body 4, and intumescent material 36, is preformed to match the circumference of a pipe 42 (FIG. 4) for which the collar is intended. Preforming the collar at this length facilitates the field installation of the collar and improves the fit and aesthetic elements of the field formed collar.

The collar 2 includes an interlock integral with the first and second anchor tabs 14, 16 that holds the collar in position surrounding the pipe 42. After the interlocking collar 2 is formed around the pipe 42, the circumferential force resulting from the metal collar body 4 tending to spring back is resisted by the stiffening flanges 24, 26 on the first and second anchor tabs 14, 16. Instead of using a conventional clasp, lock bar, or clamp, the user can simply field form the collar 2 around a pipe 42 utilizing the interlocking tabs 14 and 16, which are integral with the body 4. The thumb tab 38 may be used to position the second anchor tab 16 over the first anchor tab 14 to lock the collar 2 into place around a pipe 42.

Figure 4:
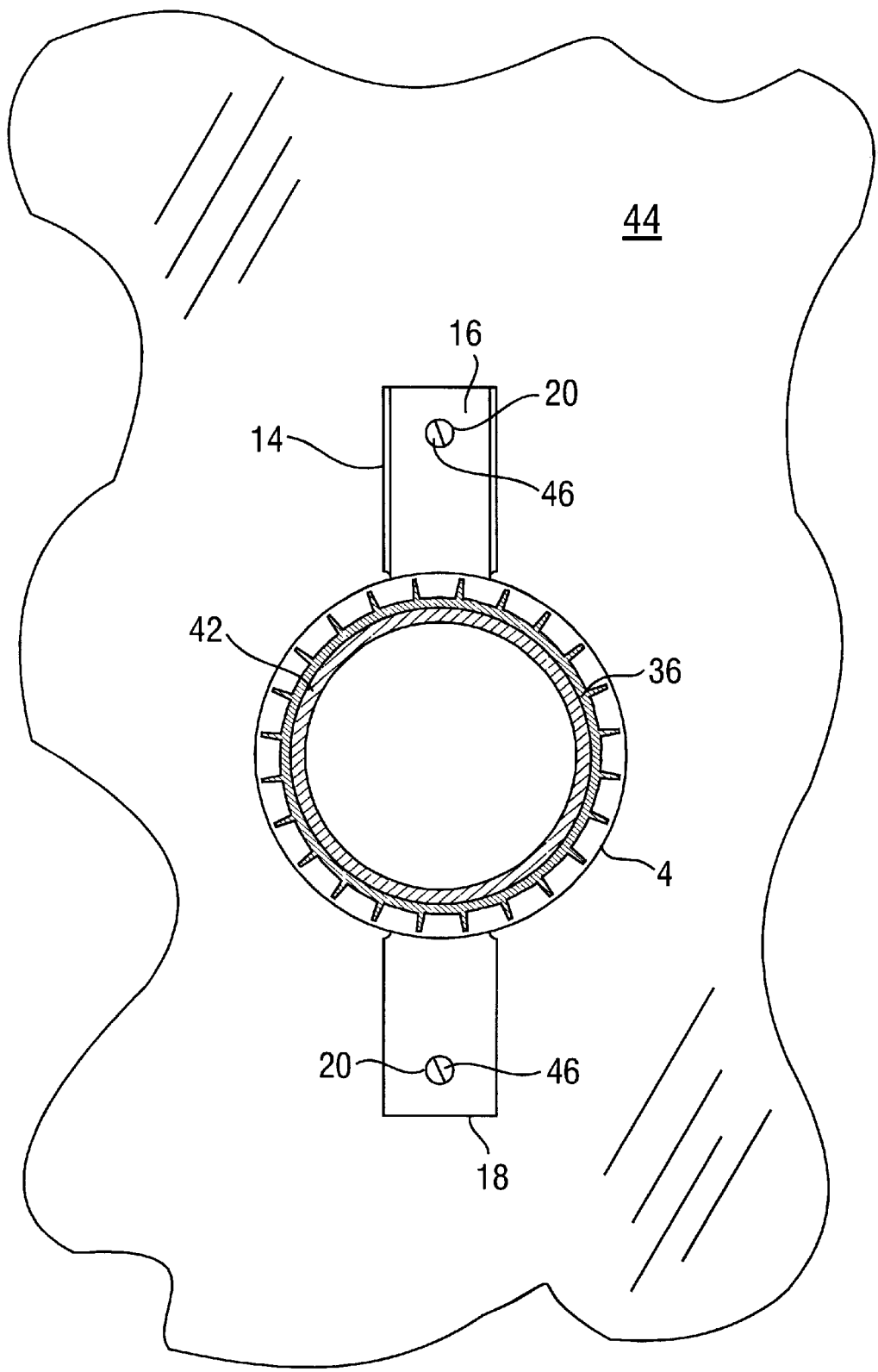
FIG. 4 illustrates a cross-sectional view of the assembly after installation.

As shown in FIG. 4, after forming the collar 2 around the pipe 42, the overlapping first and second anchor tabs 14, 16 may be fastened to a wall or floor 44 using a an appropriate fastener 46, such as a nail or screw, through the hole 20 in the tabs. Similarly, the third anchor tab 18 may be fastened to a wall or floor 44 using a fastener 46.

Figure 5:
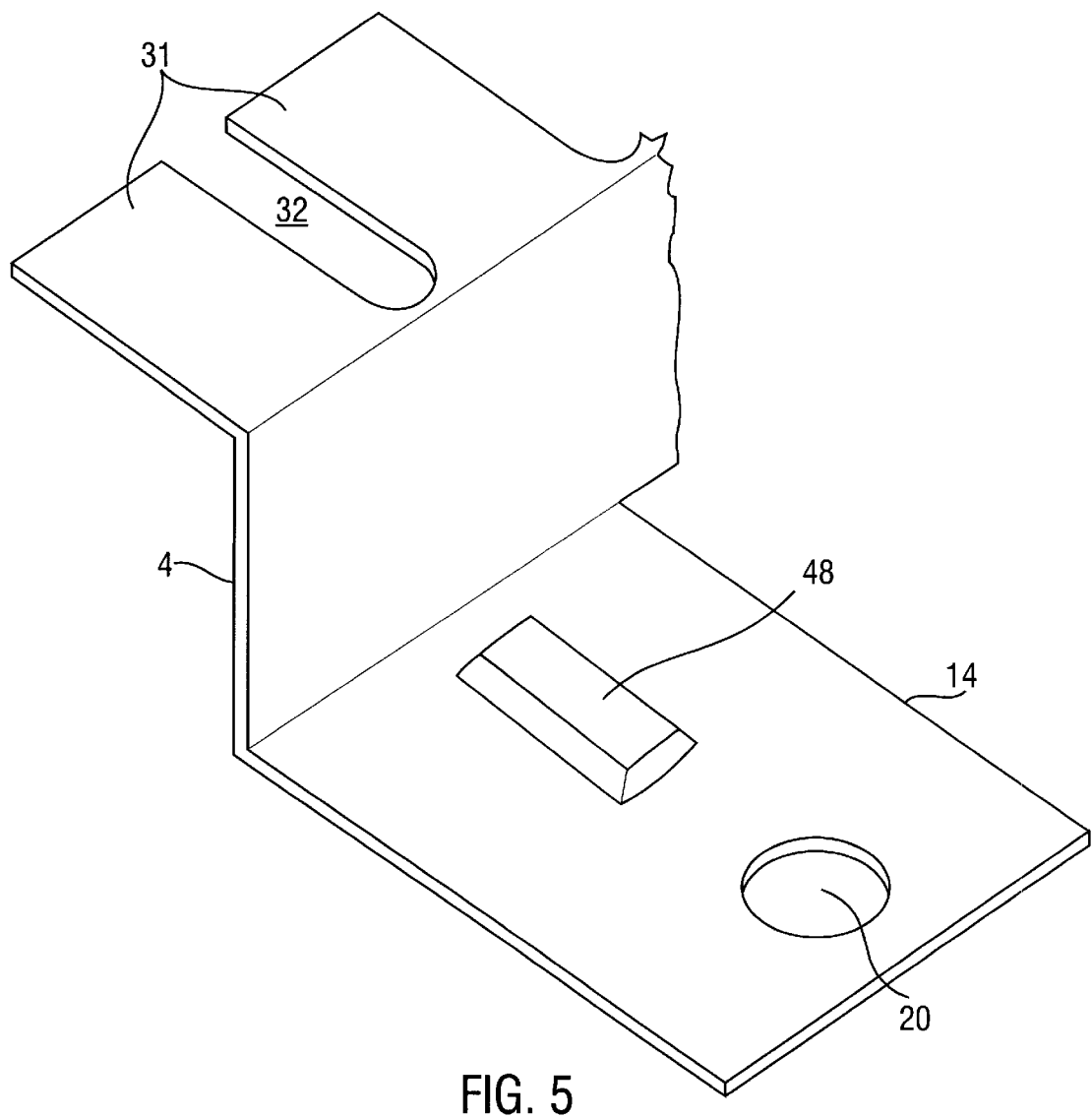
FIG. 5 illustrates a perspective view of an intumescent interlocking collar anchor tab according to a second embodiment of the present invention.

FIG. 5 shows an alternative embodiment of the present invention, in which elements corresponding to elements in FIGS. 1 through 3 are identified with the same reference numerals. As shown in FIG. 5, first and second anchor tabs 14, 16 are not required to have stiffening flanges. An upset 48, such as a draw-formed button, is provided in the first anchor tab 14. The second anchor tab 16 may have a corresponding upset or a hole adapted to receive the upset 48 on the first anchor tab 14. After the user forms the collar 2 around a pipe, the upset 48 interlocks with the upset or hole in the second anchor tab 16 to retain the collar 2 around the pipe 42.

Although particular detailed embodiments of the intumescent interlocking collar of the present invention have been described, it should be understood that the invention is not restricted to the details of the preferred embodiments, and many changes in design, configuration, and dimensions are possible without departing from the spirit and scope of the invention.

What is claimed is:

1. An intumescent pipe collar comprising:

a) a body having a first longitudinal edge;

b) a strip of intumescent material disposed on the body;

c) a first anchor tab extending from the first longitudinal edge, the first anchor tab comprising a web and stiffening flanges disposed substantially perpendicular to the web;

d) a second anchor tab extending from the first longitudinal edge;

e) the first and second anchor tabs disposed on the longitudinal edge so that the second anchor tab may be positioned in an overlapping relationship with the first anchor tab web between the stiffening flanges of the first anchor tab when the pipe collar is formed around a pipe.

2. The intumescent pipe collar of claim 1 wherein the second anchor tab has a web and stiffening flanges extending substantially perpendicular to the web.

3. The intumescent pipe collar of claim 1 wherein the body has a second longitudinal edge and wherein the pipe collar comprises a restricting flange extending from the second longitudinal edge.

4. An intumescent pipe collar comprising:

a) a body having a first longitudinal edge;

b) a strip of intumescent material disposed on the body;

c) a first anchor tab extending from the first longitudinal edge, the first anchor tab comprising a web and a first upset extending outward from the web;

d) a second anchor tab extending from the first longitudinal edge, the second anchor tab comprising a web and a second upset extending outward from the web;

e) the first and second anchor tabs positioned on the longitudinal edge so that the first upset and the second upset may be positioned in interlocking relationship when the pipe collar is formed around a pipe.

5. The intumescent pipe collar of claim 4 further comprising a third anchor tab extending from the first longitudinal edge between the first and second anchor tabs.

6. The intumescent pipe collar of claim 4 wherein the body has a second longitudinal edge and wherein the pipe collar comprises a restricting flange extending from the second longitudinal edge.

7. The intumescent pipe collar of claim 4 wherein the intumescent strip is disposed on one surface of the body and the anchor tabs extend substantially perpendicularly outward from the body in the direction opposite the surface.

8. An intumescent pipe collar comprising:

a) a body having a first longitudinal edge;

b) a strip of intumescent material disposed on the body;

c) a first anchor tab extending from the first longitudinal edge, the first anchor tab comprising an upset extending from the first anchor tab;

d) a second anchor tab extending from the first longitudinal edge, the second anchor tab comprising a web and an opening in the web adapted to receive the upset;

e) the first and second anchor tabs positioned on the longitudinal edge so that the upset and the opening may be positioned in interlocking relationship when the pipe collar is formed around a pipe.

9. The intumescent pipe collar of claim 8 wherein the body has a second longitudinal edge and wherein the pipe collar comprises a restricting flange extending from the second longitudinal edge.

10. The intumescent pipe collar of claim 8 wherein the intumescent strip is disposed on the surface of the body and the anchor tabs extend substantially perpendicularly outward from the body in the direction opposite the surface.

11. The intumescent pipe collar of claim 2 wherein the body has a second longitudinal edge and wherein the pipe collar comprises a restricting flange extending from the second longitudinal edge.

12. The intumescent pipe collar of claim 8 further comprising a third anchor tab extending from the first longitudinal edge between the first and second anchor tabs.

13. The intumescent pipe collar of claim 12 wherein the body includes a second longitudinal edge, the collar further comprising a flange extending from the second longitudinal edge.

* * * * *